(12) United States Patent
Clark

(10) Patent No.: US 7,669,554 B2
(45) Date of Patent: Mar. 2, 2010

(54) DOG DRINKING DEVICE

(76) Inventor: Debra Clark, 272 Edith Drive, Innisfil, Ontario (CA) L9S 2L7

( * ) Notice: Subject to any disclaimer, the term of this patent is extended or adjusted under 35 U.S.C. 154(b) by 191 days.

(21) Appl. No.: 11/903,698

(22) Filed: Sep. 25, 2007

(65) Prior Publication Data
US 2009/0078210 A1 Mar. 26, 2009

(51) Int. Cl.
A01K 7/00 (2006.01)
(52) U.S. Cl. ........................................................ 119/72
(58) Field of Classification Search .................. 119/72, 119/73, 74, 51.03, 63
See application file for complete search history.

(56) References Cited

U.S. PATENT DOCUMENTS

| 4,007,711 | A | * | 2/1977 | Michael | 119/51.5 |
|---|---|---|---|---|---|
| 4,246,710 | A | * | 1/1981 | Mixer | 40/651 |
| 4,386,582 | A | * | 6/1983 | Adsit | 119/51.03 |
| 5,031,575 | A | * | 7/1991 | Phillips | 119/61.53 |
| 5,117,778 | A | * | 6/1992 | Imamura | 119/51.5 |
| 5,209,184 | A | * | 5/1993 | Sharkan et al. | 119/61.56 |
| 5,329,876 | A | * | 7/1994 | Tracy | 119/51.03 |
| D373,858 | S | * | 9/1996 | Chen | D30/130 |
| 5,960,740 | A | * | 10/1999 | Pelsor | 119/61.54 |
| 6,298,777 | B1 | * | 10/2001 | Dubois et al. | 101/27 |
| 6,460,483 | B1 | * | 10/2002 | Northrop et al. | 119/74 |
| 6,928,954 | B2 | * | 8/2005 | Krishnamurthy | 119/51.5 |
| 7,270,082 | B2 | * | 9/2007 | Plante | 119/74 |
| 7,284,499 | B1 | * | 10/2007 | Kuster | 119/51.5 |
| 2007/0199512 | A1 | * | 8/2007 | Ellis | 119/61.54 |
| 2008/0078330 | A1 | * | 4/2008 | McCallum et al. | 119/72 |
| 2008/0257272 | A1 | * | 10/2008 | Bolda | 119/72 |

* cited by examiner

Primary Examiner—Rob Swiatek
Assistant Examiner—Ebony Evans
(74) Attorney, Agent, or Firm—David W. Wong

(57) ABSTRACT

A dog drinking device has a trapezoidal water container with a top cover. A rotatable round drum made of plastic or stainless steel is rotatably mounted in the water container. A plurality of transverse grooves formed on the round surface of the drum. A top portion the round surface of the drum is exposed through a rectangular access opening of the cover. A long ear dog may drink the water by standing at the narrower front end of the device with its ears falling on the outside of two forward converging sides of the trapezoidal shape water container and licking the water carried to the exposed round surface of the drum by the transverse grooves without water splashing on its face and floor area around the device or to its ears to cause potential ear infection.

9 Claims, 4 Drawing Sheets

DOG DRINKING DEVICE

BACKGROUND OF THE INVENTION

1. Field of the Invention

This invention relates to a drinking device for dogs and particularly for dogs with long ears.

2. Background Art

Commonly, a dish or bowl is used for providing drinking water for dogs. When a dog drinks from a drinking dish or bowl, due to the slapping of its tongue in the water during drinking, water from the dish or bowl often splashes on to the dog's face and muzzle. Also, water would also spill and trail over the floor area around the dish or bowl and is stepped over and tracked to other floor area by the dog. Furthermore, to dry itself, the dog would shake off the water which could spread over a wider area of the floor as well as to furniture in the close vicinity. The spilled water on the floor as well as that on the furniture would cause potential sanitary problems and/or slippery floor hazard. It is even more problematic for dogs with long ears, due to that their ears would either be located in the close neighborhood of the water dish or bowl when the dog lower its head to the dish or bowl during drinking, and often the lower portion of its long ears would actually dip into the water in the dish or bowl, thus water could enter and remain in their ears to cause ear infections.

SUMMARY OF THE INVENTION

It is the principal object of the present invention to provide a drinking device for dogs to drink without causing water to splash onto their face and muzzle and the floor area around the device.

It is another object of the present invention to prevent water from entering the ears of a long-eared dog during drinking.

It is another object of the present invention to provide a drinking device from which dogs may drink cleanly without causing water spillage to the floor area.

It is another object of the present invention to provide a dog drinking device that is simple in construction.

BRIEF DESCRIPTION OF THE DRAWINGS

The invention will be more clearly understood with the aid of the following description with reference to the appended drawings in which.

DETAILED DESCRIPTION OF THE PREFERRED EMBODIMENT

Figure 1:
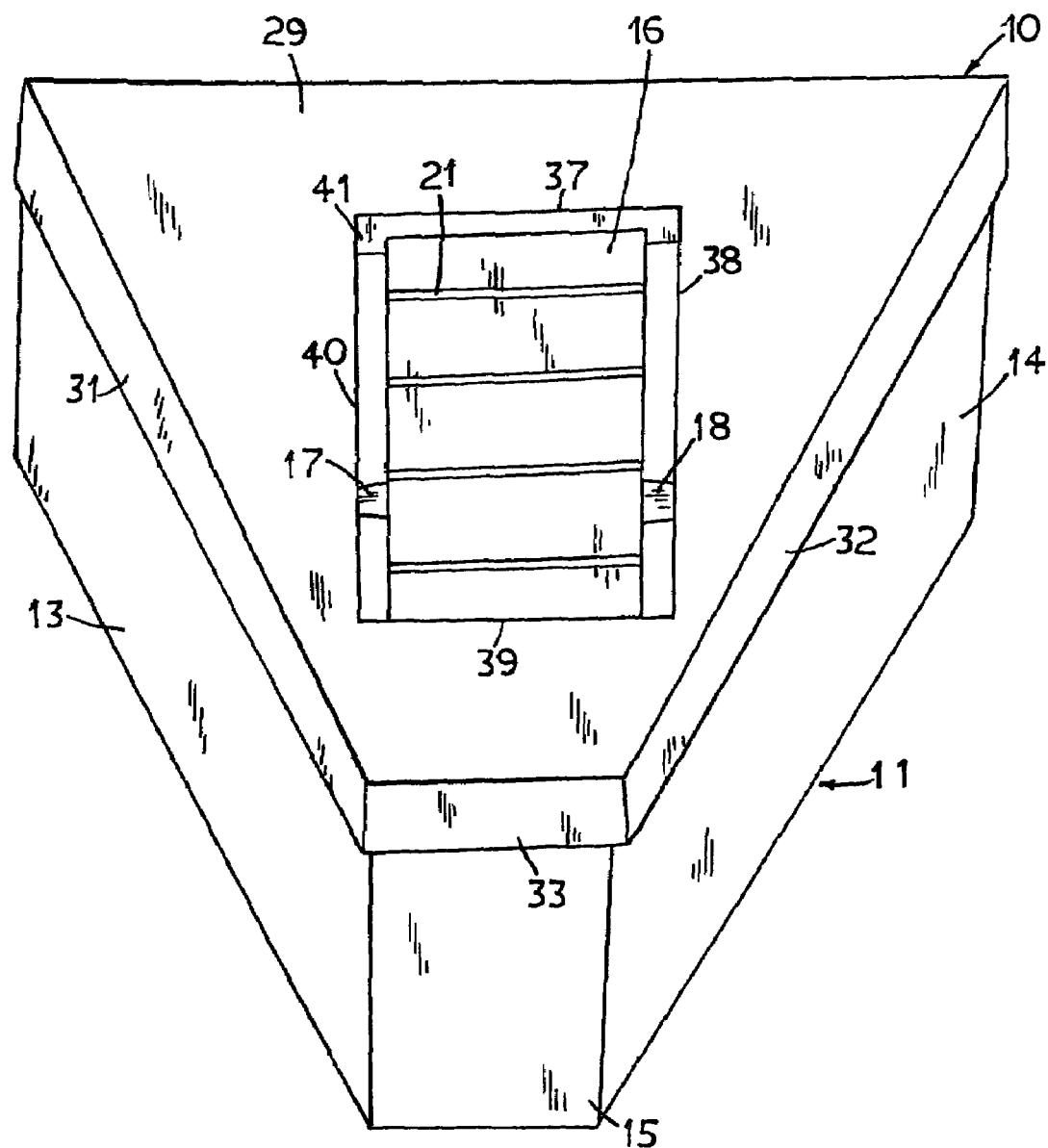
FIG. 1 is a top and front perspective elevation view of the drinking device according to the present invention.

With reference to the drawings in which like reference numerals designate corresponding parts in the different views, the drinking device 10 of the present invention has a generally trapezoidal shaped water container 11 having a rear wall 12 and two side walls 13 and 14. The side walls 13 and 14 are preferably slanting forward towards one another to a front wall 15 having a width shorter than the rear wall 12. The container 11 may alternatively have a triangular shape with the side walls 13 and 14 converging forward to a pointed front end. The trapezoidal shape provides better stability than the triangular shape for the container so as to prevent it from tipping.

A circular drum 16 is located in the water container 11. The drum 16 has two opposite flat side surfaces 19 and 20 and a round surface 22 and it has a support axle having two arms 17 and 18 extending sideways directly opposite to one another from the center of the two side surfaces 19 and 20 respectively. The drum 16 is preferably made of a plastic material or stainless steel and a plurality of transverse grooves 21 are formed in its wide round surface 22 and extending between the two flat side surfaces 19 and 20. The transverse grooves 21 preferably have a depth extending inwardly towards the center axis of the drum at a downward angle with respect to the diameter of the drum 16. The transverse grooves 21 may have a V-shaped cross section as shown in the exemplary embodiment. Two mounting tracks 23 and 24 having a mirror image of one another in shape and construction are formed at the center location on the inside surface of the side walls 13 and 14 of the water container 11. The mounting tracks 23 and 24 are generally L-shaped and have vertical channels 25 and 26 respectively extending from an upper open end to a round depression 27 curving sideways from the lower end of the channels 25 and 26 respectively. The drum 16 may be removably and slidably mounted within the water container 11 by sliding engagement of the arms 17 and 18 with the channels 25 and 26 respectively until the end of the two arms 17 and 18 of the axle engage with the round depression 27 of both mounting tracks 23 and 24 respectively for maintaining the drum 16 rotatably and securely mounted in the water container 11. The upper portion of the round surface 22 of the drum 16 extends flush with the upper edge 28 of the water container 11 when it is mounted therein.

A cover 29 having a shape similar to the water container 11 and having slightly larger dimensions is removably mounted on top of the water container 11. The cover 29 has downward skirting rear wall 30, side walls 31 and 32 and front wall 33. The cover 29 and the water container 11 may be snap-mounted together with the provision of engaging means such as a rib 34 formed around the top edge portion of the outer surface of the rear wall, side walls and front wall of the water container 11 and a mating groove 35 formed around the edge portion of inside surface of the skirting rear wall, side walls and front wall of the cover 29. The rib 34 and the mating groove 35 are engageable with each other in a snap action for securely retaining the cover 29 mounted on the water container 11. Alternatively, the rib may be formed on the cover 29 and the engageable rib formed on the water container 11 for the same purposes.

A rectangular access opening 36 is formed in the cover 29. The top portion of the round surface 22 of the drum 16 is exposed in the rectangular access opening 36 and it may be located flush with or extending upwards beyond the top surface of the cover 29 with the drum 16 mounted in the water container 11. The four sides 37, 38, 39 and 40 of the rectangular opening 36 are located in close proximity but spaced from the round surface and side surfaces of the drum 16. The four sides of the rectangular opening 36 have short skirting flanges 41, 42, 43 and 44 respectively extending downward and preferably sloping slightly towards the drum 16.

Figure 2:
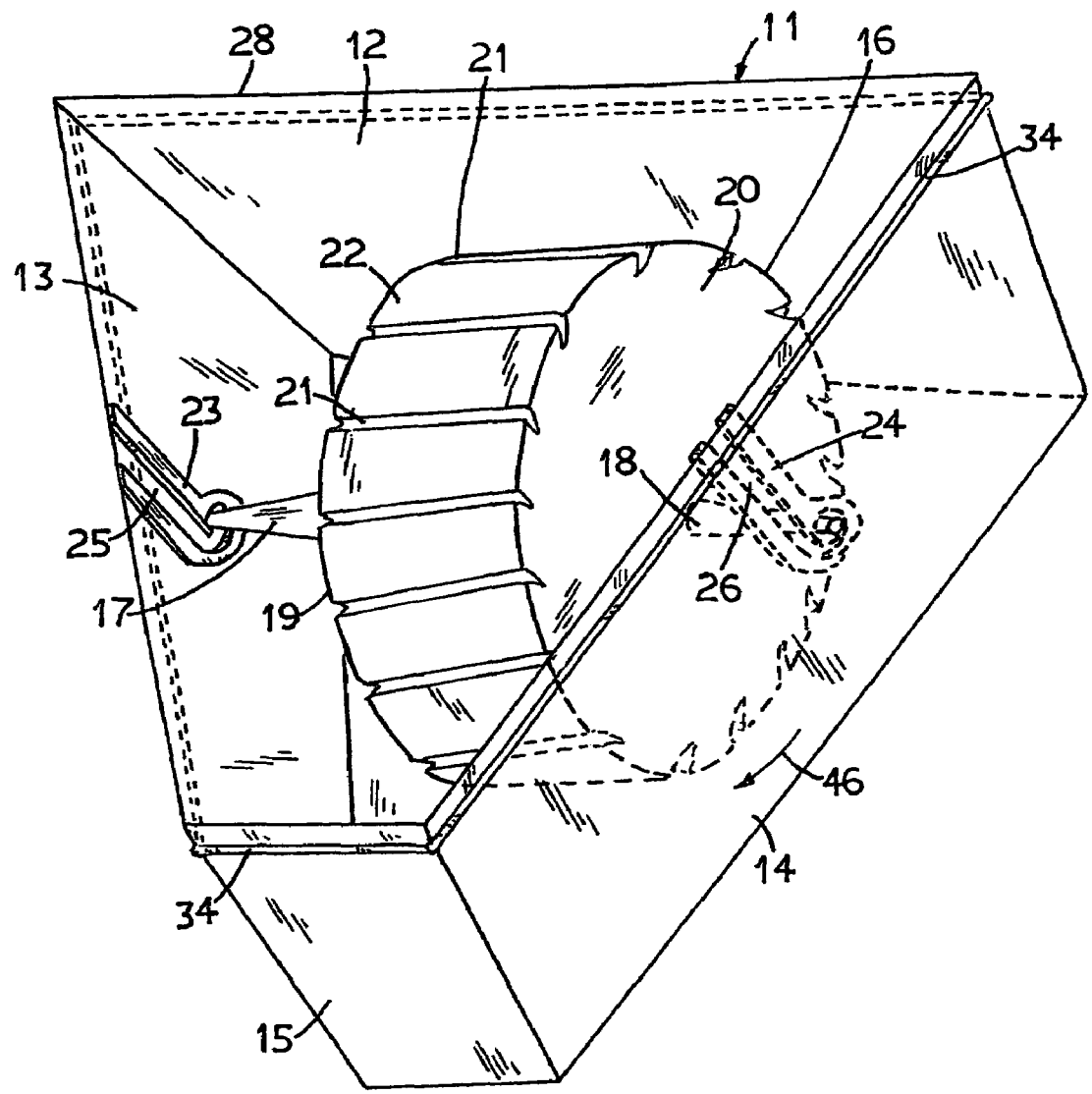
FIG. 2 is a top and front perspective elevation view of the water container with the cover removed showing the rotatable drum removably mounted therein.
Figure 3:
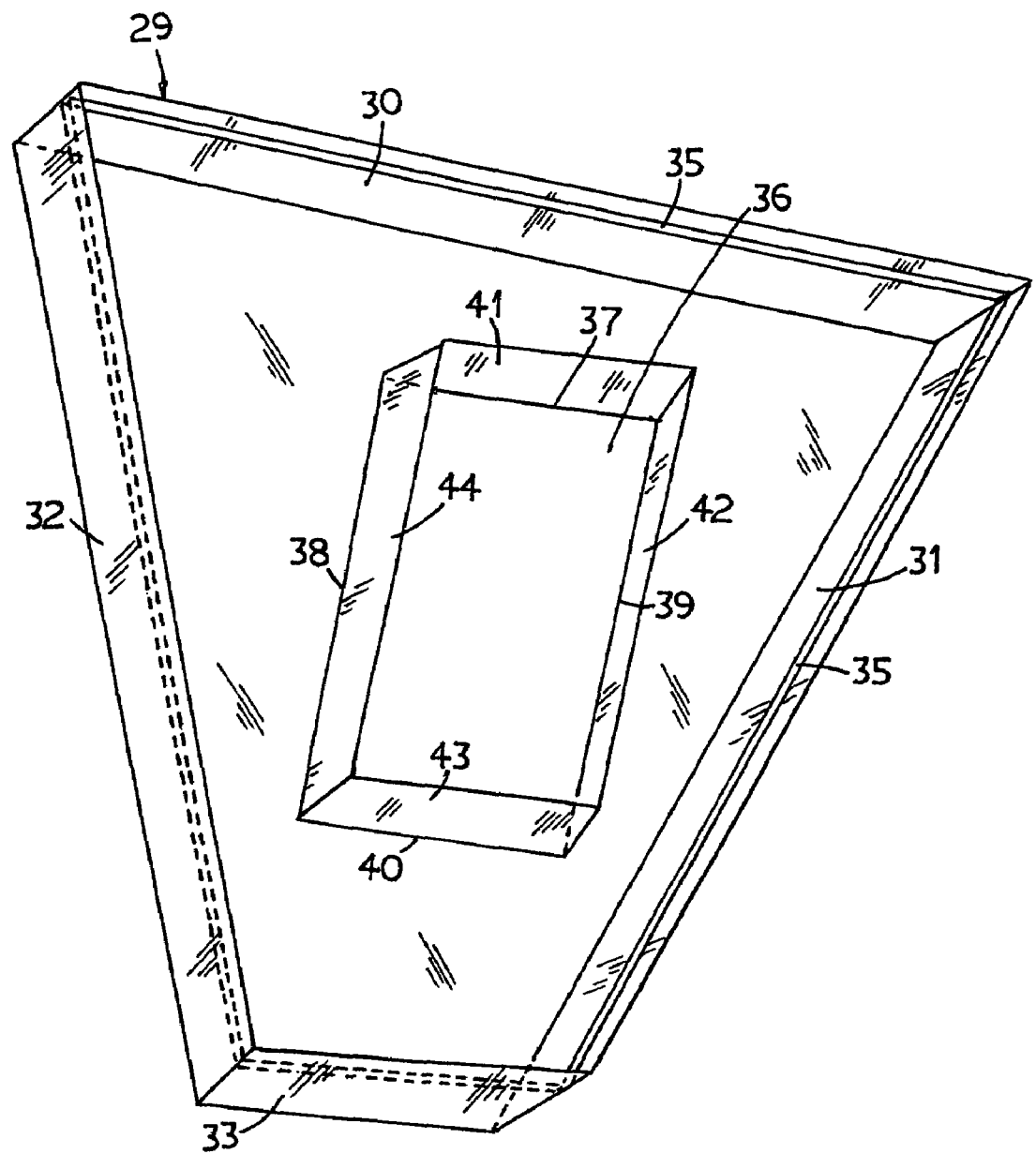
FIG. 3 is a bottom and front perspective elevation view of the cover of the water container.
Figure 4:
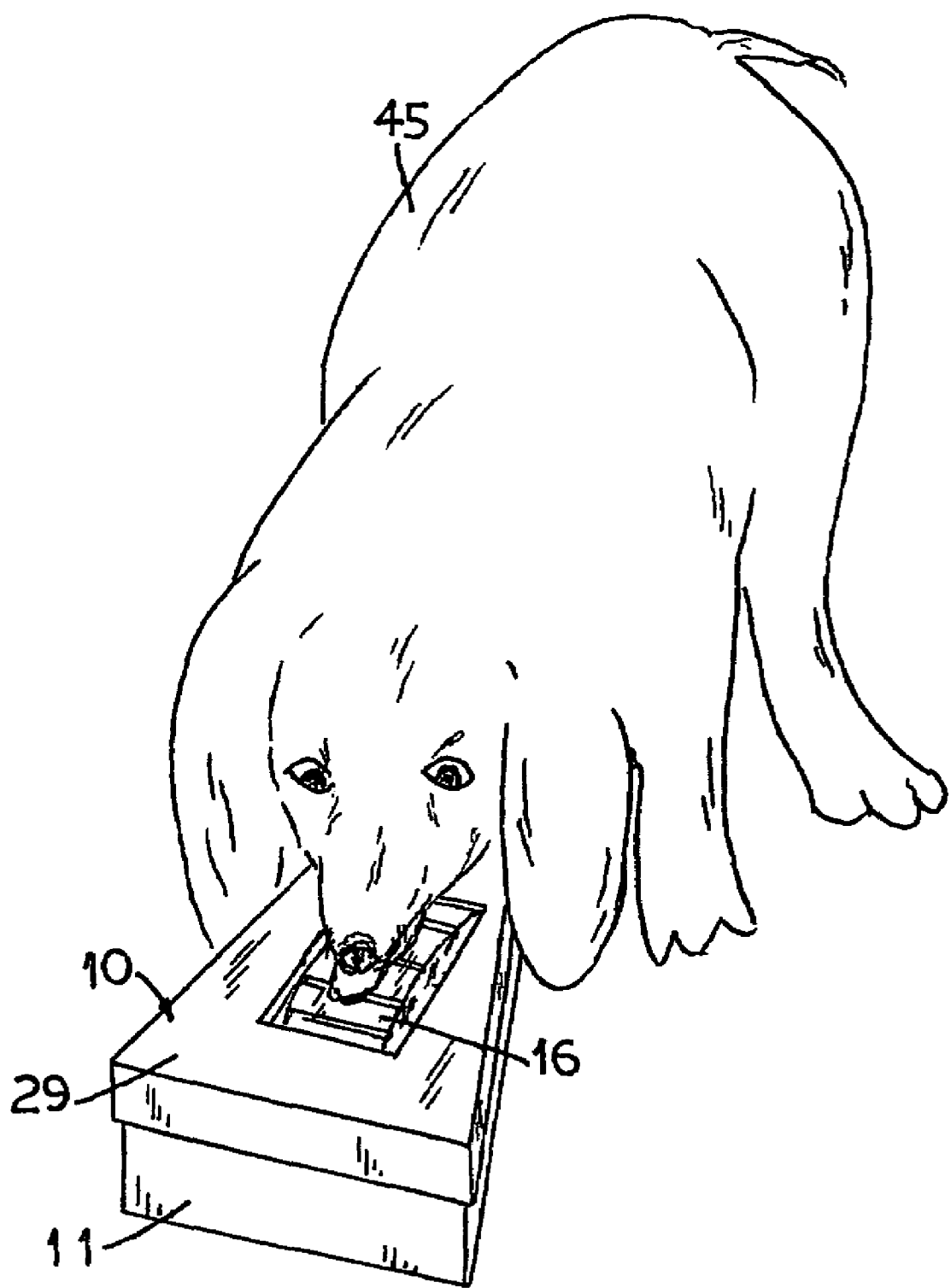
FIG. 4 is a perspective elevation view showing a dog drinking from the device of the present invention.

In use, the water container 11 is filled with the drinking water and the lower portion of the drum 16 is immersed in the latter. The cover 29 is securely snap-mounted on top of the water container 11 with only the top portion of the round surface 22 of the drum 16 exposing in the access opening 36. As shown in FIG. 4, the dog 45 is trained to drink the water from the device 10 by standing at the front side of the device and to drink by licking the round surface 22 of the drum 16 exposing in the rectangular opening 36. The licking action will cause the drum 16 to rotate backward towards the rear of the device 10 as shown by the curve arrow 46 in FIG. 2, so that water in the water container 11 is carried by the grooves 21 upwards continuously to the upper portion of the round surface 21 exposed in the rectangular access opening 36 of the round surface so as to provide the drinking water for the dog. The downward slanting depth of the transverse grooves 21 enhances that a satisfactory amount of drinking water is carried on the exposed round surface and running over the upper surface 22 of the rotating drum 16 for the dog to drink.

Water is prevented from splashing by the close fitting between the access opening 36 and the surfaces of the drum 16. The downwardly sloping flanges 41, 42, 43 and 44 will return splashing water, if any, to run back into the water container 11 or towards the drum 16. The ears of a long-eared dog will be positioned adjacent to the side walls 13 and 14 during drinking so that they are protected by the forward converging side walls 13 and 14 as well as the cover 29 without exposing to any splashing water or the danger of dipping into the drinking water in the container 11 to cause potential ear infection.

Of course, the invention is not limited to the embodiments which have been described and it may, on the contrary, be modified in numerous ways which will become apparent to a person skilled in the art.

What I claim is:

1. A dog drinking device comprising,
    a trapezoidal shaped water container having a rear wall, a front wall, and two side walls, said rear wall being longer in width than said front wall, and said side walls slanting forwardly from the longer rear wall towards said front wall,
    a cover similar in shape and larger in dimensions than said container, said cover being securely and removably mountable on top of said water container,
    a generally rectangular access opening formed in said cover,
    a round drum rotatably and removably mounted within said water container, said drum having a wide circumferential surface, and an uppermost portion of said surface being located flush with a top edge of said water container in use and exposed in said access opening of said cover,
    an axle having two arms extending from opposite flat side surfaces of said drum,
    two mounting tracks formed at a center location on an inside surface of said side walls of said water container, said mounting tracks having a mirror image of one another in shape and construction and having a channel formed therein, and said two arms of said axle of said drum being slidably and rotatably engaged with said channel of said mounting tracks for maintaining said drum rotatably and securely mounted within said water container,
    a plurality of transverse grooves formed in said circumferential surface of said drum, said grooves extending between said two flat side surfaces of said drum,
    skirting flanges formed at all sides of said access opening, said flanges extending downwardly and slanting in close proximity and adjacent to said circumferential and said two flat side surfaces of said drum.

2. A dog drinking device according to claim 1 wherein said transverse grooves extend inwardly towards the center axis of said drum at a downward angle with respect to the diameter of said drum.

3. A dog drinking device according to claim 2 including a rib formed adjacent to atop edge of said rear wall, side walls and front wall of said water container, and a mating mounting groove formed adjacent to a lower edge of said skirting side walls of said cover, said rib and said mating mounting groove being engageable with one another in a snap action for maintaining said cover securely and removably mounted on said water container.

4. A dog drinking device according to claim 2 including a mating mounting groove formed adjacent to a top edge of said rear wall, side walls and front wall of said water container, and a rib formed adjacent to a lower edge of said skirting side walls of said cover, said mating mounting groove and said rib being engageable with one another in a snap action for maintaining said cover securely and removably mounted to said water container.

5. A dog drinking device according to claim 2 wherein said drum is made of a plastic material.

6. A dog drinking device according to claim 2 wherein said drum is made of stainless steel 7. A dog drinking device according to claim 2 wherein said transverse grooves have a V-shaped cross section shape.

8. A dog drinking device according to claim 2 wherein said transverse grooves have a rectangular cross section shape.

9. A dog drinking device according to claim 2 wherein said transverse grooves have a generally round cross section shape.

* * * * *